Patented Mar. 3, 1931

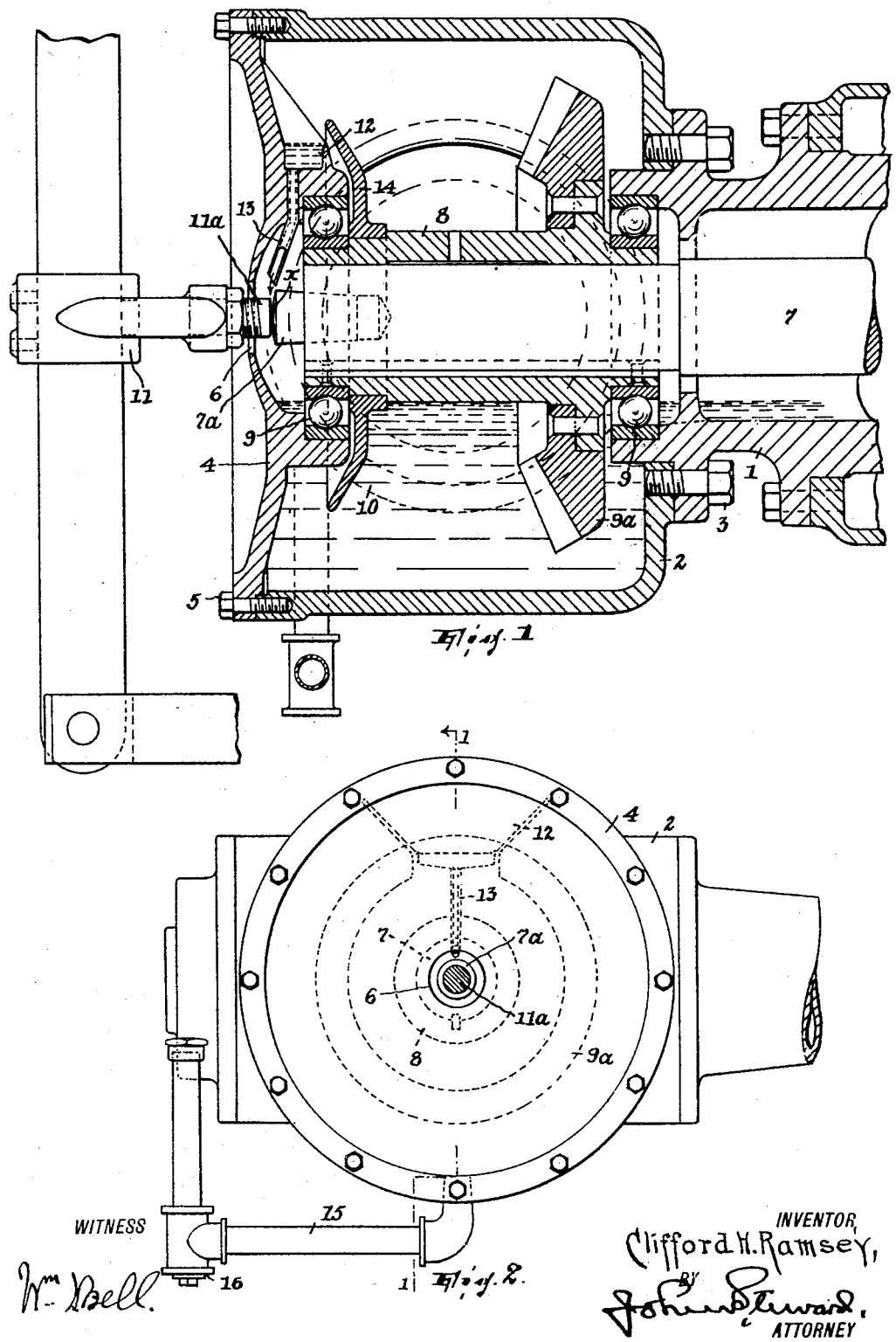

1,794,921

UNITED STATES PATENT OFFICE

CLIFFORD H. RAMSEY, OF GLEN ROCK, NEW JERSEY

LUBRICATING SYSTEM

Application filed February 7, 1929. Serial No. 338,108.

In the case of certain bearings their lubrication is left to be performed manually, in consequence of which the lubrication is often neglected, resulting in damage by friction to the parts involved, and in addition the lubricant falls or is thrown by moving parts on the machine or the floor near the machine, creating an untidy condition. This is the case at the bearing point between a rotary shaft which requires to be shifted longitudinally to establish a driving connection (as between a face-plate and a friction-wheel) and the shifter for such shaft. The object of this invention is to provide for lubricating such a bearing automatically and so that the bearing and the lubricant will be completely housed and the same lubricant continually used.

In the drawing,

Fig. 1 shows the invention applied in the lubricating of the bearing between a shaft, such as that in the instance mentioned, and its shifter, certain parts appearing in vertical section on line 1—1, Fig. 2; and Fig. 2 is a left-hand elevation of what appears in Fig. 1, with the stud of the shifter in transverse section.

A support 1, here formed tubular with its axis horizontal, has according to the invention a housing extension, or housing, 2 secured thereto by screws 3, and this housing has a removable cover plate, or cover, 4 at its outer otherwise open end secured thereto by screws 5, the same having a small central opening 6. 7 is the mentioned rotary shaft which is splined in a sleeve 8 journaled in bearings 9 supported by parts 1 and 4 and which carries within the housing a bevel gear 9a to be rotated, so as to rotate the shaft, by another bevel gear 10 within the housing and shown by dotted lines. The shaft may be assumed to have a face plate to be frictionally engaged, on shifting the shaft to the right in Fig. 1, with a friction-wheel (the face-plate and friction-wheel being not shown), such shifting being accomplished by the manually or otherwise operated shifter 11. The shifter has a stud 11a which has contact with a stud 7a on the shaft, the point of contact between the studs forming (here) the bearing $x$ to be lubricated.

A conductor is provided which has an upper receiving and a lower delivery end within the housing, the latter end being arranged above the bearing. This conductor may comprise a well 12 formed in the cover 4 from which leads downwardly to a point over the bearing a tube 13.

The housing is adapted to receive and retain a liquid lubricant body therein, and for delivering the lubricant from the main or standing body thereof upwardly into the well a part of the rotary means within the housing (as a part of sleeve 8), dips in the lubricant body and is arranged to throw the lubricant centrifugally over the upper end of the conductor. Said part is here a flange 14 arranged on and fixed to rotate with said sleeve and having its marginal or dipping portion conforming to a concavo-convex cone whose apex is directed from the conductor, said flange being so arranged that when in rotation centrifugal action will deliver lubricant over the well so that it will then by gravity fall into the same and be conveyed to the bearing $x$ by the conductor. Thus the bearing is kept continually lubricated and the lubricant is used over and over again. If the conductor is so placed, as in the present example, that it is not spaced from that wall of the housing from which the apex of the cone is directed but has the interior surface of its upper end a downward continuation of the surface of said wall, then lubricant which might otherwise be thrown over the upper end of the conductor is stopped by said wall and flows down the same into the upper end of the conductor, and if the latter is enlarged to the form of a well of appreciable area, as shown, however great the speed of the rotary member may be there will always be adequate delivery of lubricant to the bearing. Further, the space in which bearing $x$ is located is so far effectually partitioned off from the space containing the main lubricant body that in the surging or throwing about of the latter by the gear 9a leakage of the lubricant at 6 is prevented.

A standpipe 15 communicates with the bottom of the housing and has an upper exterior open end by which the housing may be filled with lubricant to the level of said end and also a normally closed outlet 16 by which the housing may be drained of lubricant.

Having thus fully described my invention, what I claim is:

In combination, a housing adapted to contain a liquid lubricant body and having a bearing inwardly spaced from one of its side walls, a rotary member journaled in said bearing on a substantially horizontal axis and projecting through said bearing, said member and bearing partitioning off the space between the bearing and said side wall from the remaining space of the housing, and means projecting into said housing through said wall and affording an additional bearing for said member in the former space, said member having means dipping in said body to project the lubricant over the first bearing and said housing having means to conduct the thus-projected lubricant downwardly into the first space onto the second bearing.

In testimony whereof I affix my signature.

CLIFFORD H. RAMSEY.